United States Patent [19]

Bochor et al.

[11] Patent Number: 4,618,952
[45] Date of Patent: Oct. 21, 1986

[54] COMMUNICATION OF UNIPOLAR PULSES

[75] Inventors: Meir Bochor, Herzlia; Mordechai Gura, Haifa, both of Israel

[73] Assignee: Fibronics Ltd., Haifa, Israel

[21] Appl. No.: 551,882

[22] Filed: Nov. 14, 1983

[30] Foreign Application Priority Data

Nov. 4, 1983 [IL] Israel .................................. 70134

[51] Int. Cl.$^4$ .............................................. H04J 7/02
[52] U.S. Cl. ........................................ 370/78; 370/119
[58] Field of Search ................... 375/17, 36; 333/119; 370/6, 24, 31, 78, 19, 9; 328/118, 119; 307/518, 236; 179/170 R, 170 D, 170 K, 170 NC, 170 T

[56] References Cited

U.S. PATENT DOCUMENTS

| | | | |
|---|---|---|---|
| 185,588 | 12/1876 | Smith | 370/37 |
| 2,182,119 | 12/1939 | Gohorel | 340/825.59 |
| 2,466,230 | 4/1949 | Goldberg | 370/78 |
| 2,607,035 | 8/1952 | Levine | 370/9 |
| 2,611,025 | 9/1952 | Jankowski | 340/825.59 |
| 2,889,540 | 6/1959 | Bauer et al. | 340/825.57 |
| 3,181,087 | 4/1965 | Almering | 179/170 D |
| 3,213,424 | 10/1965 | Reuther et al. | 340/825.06 |
| 3,546,672 | 12/1970 | Van Baardewijk | 307/115 |
| 3,594,509 | 7/1971 | Shimamura | 332/11 D |
| 4,153,848 | 5/1979 | Miyazaki | 328/118 |
| 4,337,436 | 6/1982 | McArdle et al. | 340/825.57 |

Primary Examiner—Douglas W. Olms
Assistant Examiner—Kenneth I. Rokoff
Attorney, Agent, or Firm—Browdy & Neimark

[57] ABSTRACT

A unipolar pulse communication system exploits the fact that certain computer terminals will react only to information pulses of a specific polarity and remain passive to pulses of the reverse polarity. A device at one end of the system passes pulses unchanged, from a first station of a computer to a single cable at the output of the device. Pulses received from a second station of the computer pass through the same device but are inverted before being passed through to the same cable. At the other end of the cable, all pulses are passed unchanged to a third station, and all pulses are inverted and then passed through to a fourth station. As the third and fourth stations only react to information pulses of a specific polarity, the result of the device is to permit two stations of the computer to be connected to two remote stations using only a single interconnecting cable. The device at either end of the cable may be designed so as to permit the same device to be used at either end of the cable.

11 Claims, 3 Drawing Figures

COMMUNICATION OF UNIPOLAR PULSES

The present invention generally relates to data communication systems and, more particularly, to an improved data communication system between a data controller or the like and peripheral equipment which communicates data between one another in the form of unipolar pulses.

In order to increase the reliability of the communication of data between data containing and/or processing devices, e.g. a computer controller and various peripherals, such as printers, terminals and the like, various pulse communication techniques have been developed. In accordance with one technique only data in the form of pulses of one polarity are used, i.e. unipolar pulses. For example, IBM's peripherals known by the number 3278 respond only to interrogating positive pulses from a controller and in response to such interrogation transmit only positive pulses. Likewise, the controller transmits only positive pulses and responds only to such pulses.

In the interconnections between a computer controller and peripherals, a separate input/output terminal is provided in the controller for each peripheral unit. It is through this terminal that interrogating signals are sent to the particular peripheral and through which data is received from the peripheral. Thus the number of terminals in a controller is equal to the number of peripherals it is capable of servicing. The interrogation of the peripherals is performed sequentially rather than in parallel.

Herebefore two basic arrangements have been used to interconnect the controller to each of the peripherals. One basic arrangement includes a dedicated separate cable, connected between each peripheral and the controller terminal associated therewith. Such an arrangement is quite undesirable, since the need for a dedicated cable for each peripheral makes the arrangement most expensive. This is due to the fact that the cable per unit length is not cheap, e.g. about $1,600/mile. Furthermore, the cost of cable installation and maintenance are quite high. In another basic arrangement a single cable is used for a reasonable number of peripherals, e.g. 16. However, with it, complex and expensive active multiplexers and demultiplexers are required. Thus, neither of the two basic communication systems used herebefore are believed to be satisfactory in terms of initial outlay and/or maintenance requirements. A need therefore exists for a new communication system of unipolar pulses (or signals) between a central unit and a plurality of peripheral units associated therewith. Such a need is satisfied by the present invention which may be defined as a communication system for communicating pulses of a selected polarity between either of first or second dedicated terminals of a central unit to either of first or second peripheral devices comprising:

a cable having first and second ends;

first means having first and second terminals adapted to be connected respectively to the first and second dedicated terminals of a central unit, and a third terminal connected to the cables first end, and said first means including circuit means between said terminals thereof for producing a polarity reversal of pulses between said second and third terminals and for providing a path for pulses between said first and third terminals without polarity reversal; and second means having first, second and third terminals, said third terminal being connected to the cable's second end and said first and second terminals to said first and second peripherals respectively, said second means including circuit means for producing a polarity reversal of a pulse communicated therethrough between said second and third terminals, and for passing a pulse between said first and third terminals without polarity reversal.

As will become apparent from the following description of the invention, by the incorporation of the first and second means two peripherals can be serviced by a single cable. Each of the two means can be implemented as a simple pulse transformer with a single primary (or secondary) winding and two secondary (or primary) windings of opposite winding polarities. The cost of each of these transformers is quite small. Thus, by their incorporation, the overall cost of the communication system can be reduced to nearly one half, since the number of cables needed to service every two peripherals is reduced from two to one, at the small price of one pulse transformer per peripheral.

The novel features of the invention are set forth with particularity in the appended claims. The invention will best be understood from the following description when read in conjunction with the accompanying drawings.

Attention is first directed to FIG. 1 in connection with which the novel invention will be described. Therein a central unit, such as a computer controller is designated by 10. The various peripherals with which the controller communicates by interrogating them and by receiving data therefrom, are designated by P1-Pn.

Figure 1:
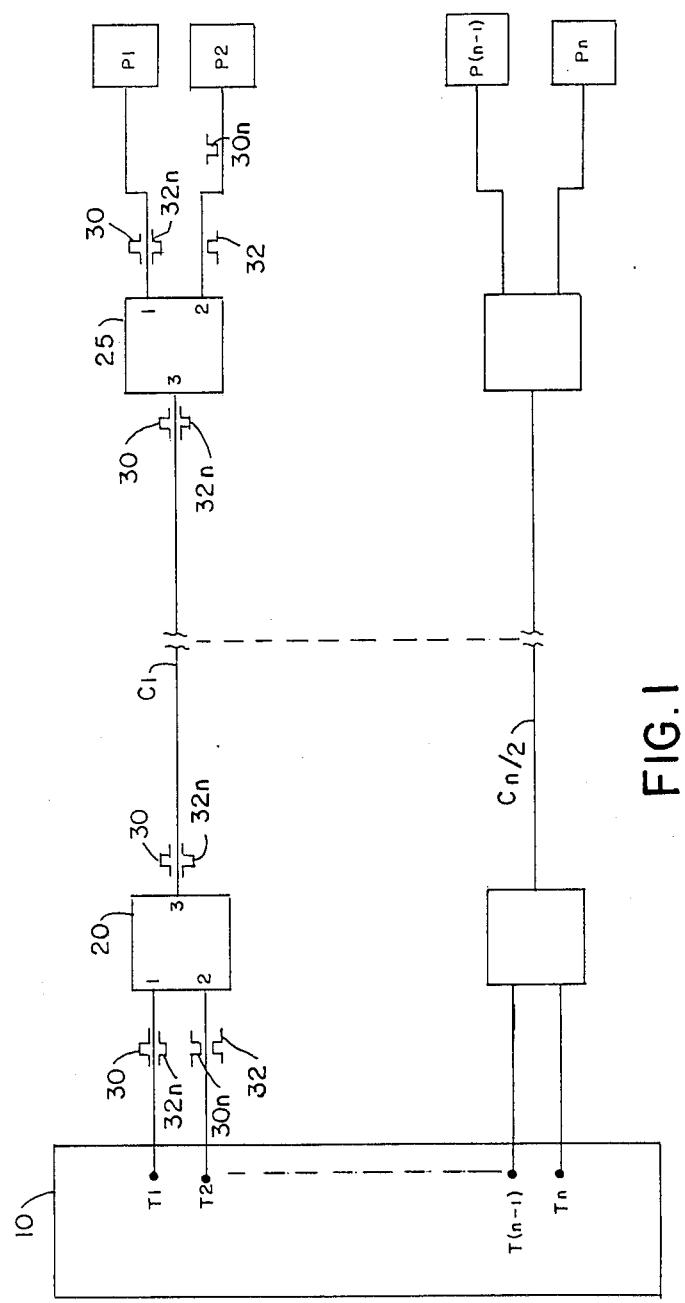
FIG. 1 is a block diagram useful in explaining the novel advantages of the present invention.

In FIG. 1 the pulses which are assumed to be meaningful are assumed to be of a positive polarity or simply positive.

As shown in FIG. 1 the communication system between the controller 10 and the various peripherals P1-Pn, designated therein by 15, includes only one cable for each pair of peripherals. As shown, P1 and P2 are serviced by a single cable C1 while peripherals P(n−1) and Pn are serviced by one cable designated C(n/2), since for n peripherals only ½(n) cables are required.

In addition each cable is associated with two circuits shown in block form and designated by 20 and 25. The two circuits will first be described in terms of their overall performance. Circuit 20 is shown having three terminals. One terminal is connected by a short cable to terminal T1 of controller 10, through which communication takes place with P1. Another terminal of circuit 20 is connected to T2 used for communication with P2, while the third terminal of circuit 20 is connected to the end of cable C1 proximate the controller.

As to circuit 25 two of its three terminals are connected respectively to P1 and P2 while its third terminal is connected to the cable end proximate the two peripherals. To assist in the following description the three terminals of each of circuits 20 and 25 are designated by 1, 2 and 3 inside their blocks, as shown.

Briefly, each of circuits 20 and 25 is designed so that any pulse is communicated between its terminals 1 and 3 without a polarity reversal, while a pulse communicated between its terminals 2 and 3 undergoes a polarity reversal. Thus a positive pulse received at terminals 1 and 2 appears as either a positive pulse or negative pulse, respectively, at terminal 3. Also, a positive pulse received at terminal 3 of circuit 20 appears as a positive pulse or negative pulse at terminals 1 and 2, respectively. The same is true for the performance of circuit 25.

From the foregoing it should be appreciated that as to the path between T1 and P1, no pulse polarity reversal takes place. However, as to the communication between T2 and P2 two polarity reversals take place which effectively cancel out one another. That the arrangement of circuits 20 and 25 together with single cable C1 is totally adequate to service the two peripheral P1 and P2 without cross feed can be exemplified by the following.

Let it be assumed that controller 10 interrogates P1 by sending positive pulses such as pulse 30, fed to terminal 1 of circuit 20. Since, as herebefore explained no polarity reversal occurs between terminals 1 and 3, the pulse 30 appears as positive at terminal 3. Therefrom, it is fed as a positive pulse to terminal 3 of circuit 25. Again no polarity reversal of this pulse takes place as far as terminal 1 is concerned. Thus a positive pulse 30 is received by P1. However, the pulse 30 at terminal 3 of circuit 25 is reversed in the circuit as far as terminal 2 is concerned. Thus, thereat it appears as negative pulse 30n. However, since each peripheral is of the type which ignores negative pulses, P2 ignores pulse 30n.

Let it be assumed now that the controller 10 interrogates P2 by applying positive pulses at T2, such as positive pulse 32. Pulse 32 at terminal 2 of circuit 20 appears as a negative pulse 32n at terminal 3, due to the polarity reversal taking place between terminals 2 and 3 in circuit 20. Pulse 32n propagates down the cable C1 and arrives at terminal 3 of 25 as a negative pulse 32n. Due to the polarity reversal between terminals 2 and 3 of circuit 25 it appears at P2 as a positive pulse identical to pulse 32 originally sent by the controller 10 at T2. Thus, P2 is interrogated with a proper positive pulse 32.

As to P1 the negative pulse 32n arriving at terminal 3 of circuit 25 also appears as negative pulse 32n at terminal 1 of circuit 25 since there is no polarity reversal of pulses between terminals 1 and 3. However, since P1 responds only to positive pulses the appearance of negative pulse 32n thereat, does not effect it since negative pulses are ignored.

It is thus seen that by including the two circuits 20 and 25 a single cable C1 can be employed to enable the controller to separately interrogate each of the two peripherals P1 and P2 without cross feed. It can also be shown that either peripheral can send positive pulses which would arrive at controller 10 with the proper polarity, namely positive, only at the controller's terminal associated with the peripheral. The other controller terminal receives negative pulses which are ignored.

For example, let it be assumed that peripheral P1, after being interrogated, sends data to T1 as positive pulses, such as pulse 30. In circuit 25 the positive pulse 30 from P1 at terminal 1 does not undergo a polarity reversal. Thus, it appears as a positive pulse 30 on the cable and is propagated to terminal 3 of circuit 20 as positive. As for terminal 1 to which T1 is connected, there is no polarity reversal and therefore the pulse arrives at T1 as positive pulse 30. As far as terminal 2 of circuit 20, the positive pulse 30 at terminal 3 is reversed. Thus it is supplied to T2 as negative pulse 30n. However, since T2 only responds to positive pulses, negative pulse 30n is ignored.

As to a positive pulse, e.g. 32, from P2 it is reversed by circuit 25 to negative pulse 32n sent over the cable. Then when arriving at circuit 20 as negative pulse 32n, it passes to T1 without polarity reversal. However, T1 ignores it due to the negative polarity. On the other hand, 32n at terminal 3 is reversed in polarity as far as terminal 2 is concerned and thus, arrives at the proper positive polarity as pulse 32 at T2.

It is thus seen that two way communication is attainable between T1-P1 and T2-P2 of unipolar pulses while pulses of an opposite polarity, which are produced, are ignored by the devices which are not in communication at the particular time. Each of circuits 20 and 25 is effectively a two-way circuit. A pulse at its first (1) terminal passes to its third (3) terminal without polarity reversal, while a pulse at its second (2) terminal appears at its third (3) terminal with a polarity reversal. There is no communication of pulses between the first (1) and second (2) terminals. Also, a pulse at the third terminal appears at both the first and second terminals, except that it appears without polarity reversal at the first terminal and with polarity reversal at the second terminal.

Figure 2:
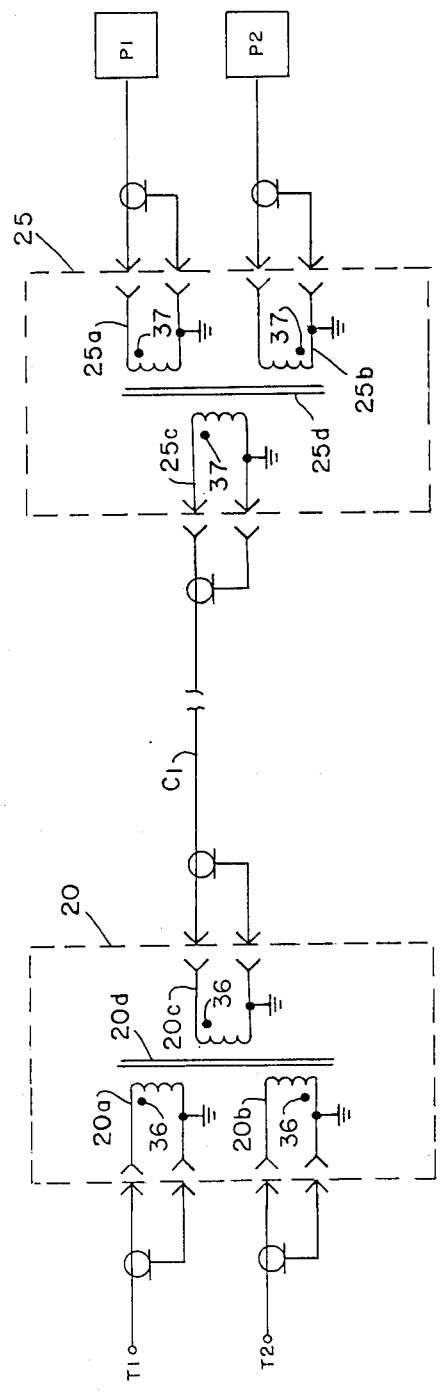
FIG. 2 is a schematic diagram of one embodiment of the invention.

It should be appreciated that circuit 20 or 25, which are effectively identical, can be implemented with active and/or passive elements. In FIG. 2, to which attention is now directed, an implementation of the two circuits with passive means is diagrammed. In FIG. 2 elements like those previously described are designated by like numerals. In FIG. 2 both cable C1 as well as the short cables which interconnect T1 and T2 to circuit 20 and P1 and P2 to circuit 25 are shown as coaxial cables or simply coaxes in which the outer sleeve of each is assumed to be grounded.

Circuit 20 is shown embodied as a multiwinding transformer with three windings 20a, 20b and 20c, respectively, connected to T1, T2 and cable C1 and wound about a core 20d. Windings 20a and 20c have the same winding sense as indicated by the locations of dots 36 while winding 20b is wound in the opposite sense as indicated by dot 36. Likewise, circuit 25 is in the form of a transformer with windings 25a and 25c of the same winding polarity as indicated by dots 37, wound about core 25d and respectively connected to P1 and cable C1. Circuit 25 further includes a third winding 25b connected to P2 and wound in the opposite direction or polarity.

During the interrogation of peripheral P1 or P2, i.e. when pulses are communicated from the controller (from left to right in FIG. 2) one of windings 20a or 20b acts as the primary, winding 20c as the secondary, winding 25c as the primary and windings 25a and 25b as the secondaries. When T1 sends a positive pulse to P1, the positive pulse on primary 20a is impressed as a positive pulse on 20c since both 20a and 20c have the same winding sense or polarity. The positive pulse impressed on 25c impresses a positive pulse on 25a to P1. The positive pulse on 25c impresses a negative pulse on 25b, which is connected to P2. However, since the pulse is negative, P2 ignores it and thus P2 is not interrogated.

On the other hand, a positive pulse from T2 and 20b has its polarity reversed when impressed on 20c due to the opposite winding polarities of 20b and 20c. A negative pulse thus appears at and is impressed on 25c. It undergoes another polarity reversal when impressed on 25b and thus appears as a positive pulse at P2, which is being interrogated. As to P1, the negative pulse on 25c is impressed on 25a without reversal. However, since P1 responds only to positive pulses, the negative pulse, received thereat as a result of the positive pulse sent via T1 to interrogate P2, is ignored.

When either peripheral P1 or P2 sends data, the winding in 25 to which it is connected acts as the primary, winding 25c acts as the secondary, winding 20c of circuit 20 acts as the primary which impresses pulses on both secondaries 20a and 20b. However, positive pulses are impressed on only one of them depending on which of the two peripherals P1 or P2 is the source of the positive pulses.

Figure 3:
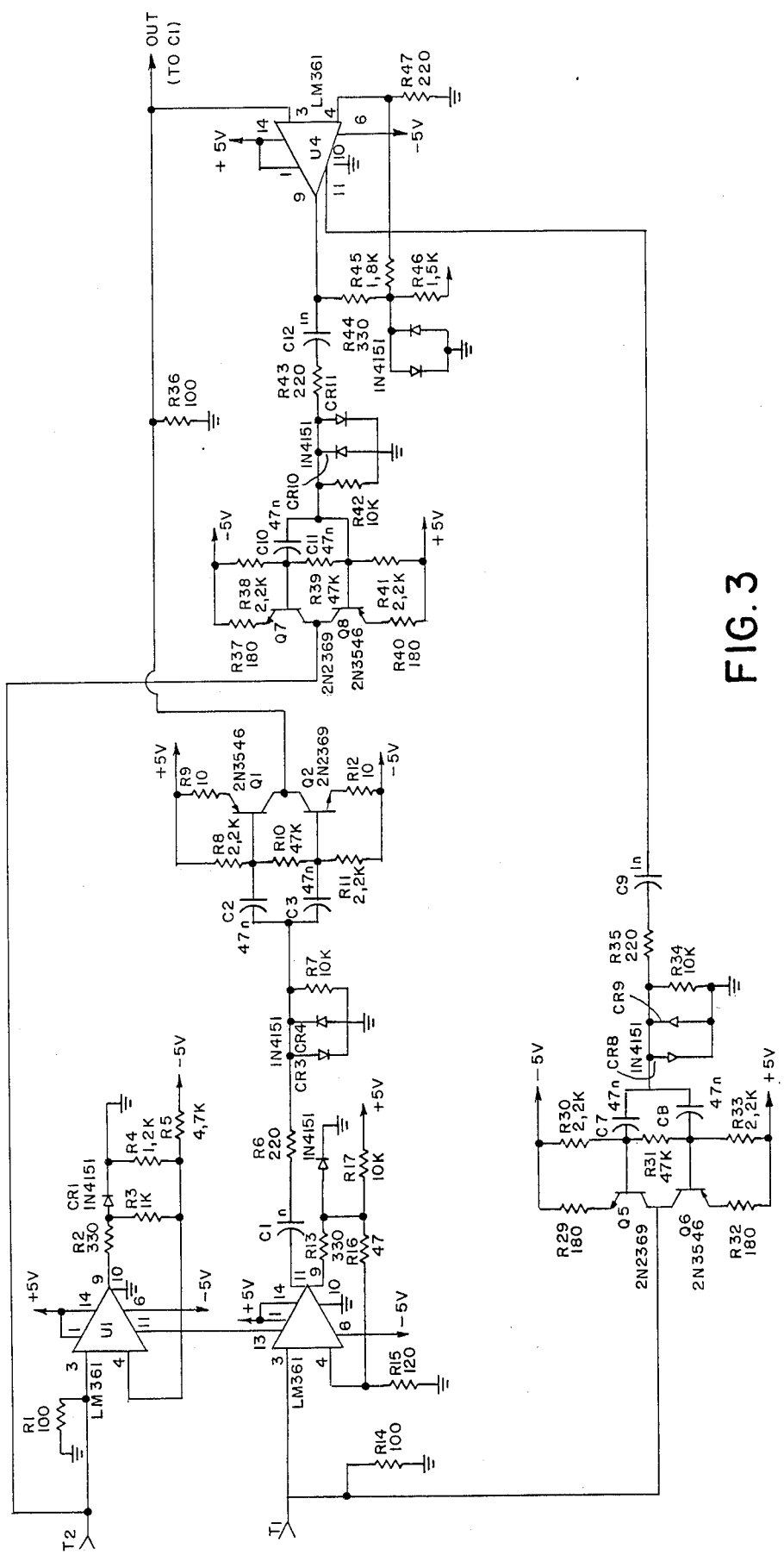
FIG. 3 is a schematic diagram of another embodiment of a basic circuit of the invention.

As previously pointed out, each of circuits 20 and 25 can be implemented with active and/or passive elements. In FIG. 2 an implementation with passive elements has been described. Attention is now directed to FIG. 3, wherein an implementation of one of these circuits, e.g. circuit 20 with active elements is diagrammed. Therein, elements like those previously explained are designated by like numerals. The input positive pulse from T1, such as positive pulse 30 (FIG. 1) goes through a Schmitt trigger transistor-transistor logic (TTL) interface U2. It appears uninverted, i.e. positive at pin 11 of U2. Therefrom, it is AC coupled to cable C1, which is connected to the terminal, designated OUT, through the driver circuit, made up of transistors Q1 and Q2 and the associated elements.

On the other hand, a positive pulse from T2 goes through Schmitt trigger TTL interface U1. Its output on pin 11 is connected to pin 13 of U2 which is the U2 enable input and therefore the pulse at pin 13 from U1, i.e. from T2 is inverted at pin 11 of U2. Thus, the positive pulse from T2 is inverted to a negative pulse at pin 11 of U2. It is this pulse that is driven as a negative pulse to cable C1 via Q1 and Q2.

As to incoming pulses from the cable, they are fed to interface U4. Pins 9 and 11 are the inverted and noninverted outputs of U4, respectively. An incoming positive pulse appears as a positive pulse at pin 11 and a negative pulse at pin 9. The positive pulse is fed via Q5 and Q6 to T1. A negative pulse, present at pin 9, is fed via Q7 and Q8 to T2, but is ignored thereat. On the other hand, an incoming negative pulse is inverted and appears as a positive pulse at pin 9 and is fed to T2, while a negative pulse appears at pin 11 and is fed to T1. However, as previously pointed out, T1 is designed to receive only positive pulses. Thus, any negative pulses are ignored by it.

From the foregoing it should thus be appreciated that in accordance with the present invention, by adding two circuits, such as 20 and 25, a single cable is needed to couple the driver 10 to every pair of peripherals. Thus, the number of cables to service n peripherals can be cut in half. For positive pulse generation, the circuits 20 and 25 operate in a way whereby a positive pulse between one terminal to an associated peripheral, e.g. T1 to P1 is not inverted, as far as P1 is concerned. One polarity reversal takes place as far as P2 is concerned, but the negative pulse is ignored. As to a positive pulse from T2 to P2, two polarity reversals take place, resulting in a positive pulse at P2. The negative pulse provided by circuit 25 to P1 is ignored. The reverse is true when a positive pulse is sent by P1 to T1 or by P2 to T2.

Although particular embodiments of the invention have been described and illustrated herein, it is recognized that modifications and variations may readily occur to those skilled in the art and consequently, it is intended that the claims be interpreted to cover such modifications and equivalents.

We claim:

1. A unipolar pulse communication system for connecting a first station on one end with a second station on the other end and for connecting a third station on one end with a fourth station on the other end using only a single cable between connector units, comprising:

a pulse transmission cable having first and second opposite ends;

a first connector unit having first, second and third end terminals, said cable being connected at said first end thereof to said first connector unit at the third end terminal thereof, said first and second end terminals thereof being adapted for connection to the first and third stations, respectively, when in use;

first circuit means within said first connector unit for providing a voltage pulse at said third end terminal whenever a voltage pulse is received at said first end terminal, the pulse provided to said third end terminal being of the same polarity as the pulse received at said first end terminal, and for providing a voltage pulse at said third end terminal whenever a voltage pulse is received at said second end terminal, the pulse provided to said third end terminal being of the opposite polarity as the pulse received at said second end terminal;

a second connector unit having first, second and third end terminals, said cable being connected at said second end thereof to said second connector unit at the third end terminal thereof, said first and second end terminals thereof being adapted for connection to the second and fourth stations, respectively, when in use; and second circuit means within said second connector unit for providing a voltage pulse at the first end terminal of said second connector unit whenever a voltage pulse is received at the third end terminal thereof, the pulse provided at said first end terminal being of the same polarity as the pulse received at said third end terminal and for providing a voltage pulse at the second end terminal of said second connector unit whenever a voltage pulse is received at the third end terminal thereof, the pulse provided at said second end terminal being of the opposite polarity as the pulse received at said third end terminal;

whereby a voltage pulse of one polarity applied at the first end terminal of said first connector unit appears as a voltage pulse of the same polarity at the first end terminal of said second connector unit and as a voltage pulse of the opposite polarity at the second end terminal of said second connector unit and a voltage pulse of one polarity applied at the second end terminal of said first connector unit appears as a voltage pulse of the same polarity at the second end terminal of said second connector unit and as a voltage pulse of the opposite polarity at the first end terminal of said second connector unit.

2. A unipolar pulse communication system in accordance with claim 1, wherein said first circuit means further has the capability of providing a voltage pulse at the first end terminal of said first connector unit whenever a voltage pulse is received at the third end terminal thereof, the pulse provided at said first end terminal being of the same polarity as the pulse received at said third end terminal and of providing a voltage pulse at the second end terminal of said first connector unit whenever a voltage pulse is received at the third end terminal thereof, the pulse provided at said second end terminal being of the opposite polarity as the pulse received at said third end terminal, and said second circuit means further has the capability of providing a voltage pulse at said third end terminal of said second connector unit whenever a voltage pulse is received at said first end terminal thereof, the pulse provided to said third end terminal thereof being of the same polarity as the pulse received at the first end terminal thereof, and providing a voltage pulse at the third end terminal of said second connector unit whenever a voltage pulse is received at said second end terminal, the pulse provided to said third end terminal being of the opposite polarity as the pulse received at said second end terminal.

3. A unipolar pulse communication system in accordance with claim 2, wherein said first and second connector units, and their respective first and second circuit means, are identical.

4. A unipolar pulse communication system as recited in claim 2 wherein at least one of said first and second circuit means includes active elements.

5. A unipolar pulse communication system as recited in claim 4 wherein said active elements include a first active element having an input coupled to the third end terminal and first and second outputs at which said active element provides pulses of the same and opposite polarities of the polarity of the pulse received at its input.

6. A unipolar pulse communication system as recited in claim 5 wherein said active elements further include active means coupled to said first and second end terminals and having a common output for providing at said common output a pulse with a polarity which is the same or opposite to the polarity of a pulse at said first or second end terminals, respectively.

7. A unipolar pulse communication system as recited in claim 1 wherein said transmission cable is a coaxial cable.

8. A unipolar pulse communication system as recited in claim 2 wherein at least one of said first and second circuit means comprises only passive circuit elements.

9. A unipolar pulse communication system in accordance with claim 8, wherein said passive elements comprise first, second and third transformer windings wound about a common core and being respectively connected to said first, second and third end terminals, said first and third windings being wound in the same winding sense and said second winding being wound in an opposite winding sense, whereby a voltage pulse of a given polarity received at said third end terminal causes an electromagnetic signal in said core which in turn generates, simultaneously, a voltage pulse of the same polarity at said first end terminal and a voltage pulse of the opposite polarity at said second end terminal.

10. A connector unit for use in a unipolar pulse communication system, comprising:

first, second and third end terminals, each of said end terminals including means for connection to a coaxial cable; and circuit means for providing a pulse at said third end terminal whenever a pulse is received at said first end terminal and for providing a pulse at said first end terminal whenever a pulse is received at said third end terminal, the pulse being provided at said third end terminal being of the same polarity as the pulses being received at said first end terminal and the pulse being provided at said first end terminal being of the same polarity as the pulse being received at said third end terminal, and for providing a pulse at said third end terminal whenever a pulse is received at said second end terminal and for providing a pulse at said second end terminal whenever a pulse is received at said third end terminal, the pulse being provided at said third end terminal being of the opposite polarity as the pulse being received at said second end terminal and the pulse being provided at said second end terminal being of the opposite polarity as the pulse being received at said third end terminal.

11. A connector unit in accordance with claim 10, wherein said circuit means comprises first, second and third transformer windings wound about a common core and being respectively connected to said first, second and third end terminals, said first and third windings being wound in the same winding sense and said second winding being wound in an opposite winding sense, whereby a voltage pulse of a given polarity received at said third end terminal causes an electromagnetic signal in said core which in turn generates, simultaneously, a voltage pulse of the same polarity at said first end terminal and a voltage pulse of the opposite polarity it said second end terminal.

* * * * *